US006643938B2

(12) United States Patent
Livingston

(10) Patent No.: US 6,643,938 B2
(45) Date of Patent: Nov. 11, 2003

(54) REPLACEMENT CUTTING ATTACHMENT FOR STRING TRIMMER

(76) Inventor: Robert J. Livingston, 312 Monkey Hill Rd., Ogdensberg, NY (US) 13669

( * ) Notice: Subject to any disclaimer, the term of this patent is extended or adjusted under 35 U.S.C. 154(b) by 59 days.

(21) Appl. No.: 10/128,634

(22) Filed: Apr. 23, 2002

(65) Prior Publication Data

US 2003/0033721 A1 Feb. 20, 2003

Related U.S. Application Data

(60) Provisional application No. 60/313,281, filed on Aug. 17, 2001.

(51) Int. Cl.[7] .............................................. A01D 34/84
(52) U.S. Cl. .............................. 30/347; 30/276; 56/12.7
(58) Field of Search ..................... 30/276, 347; 56/12.7; 24/16 PB, 17 B, 17 AP

(56) References Cited

U.S. PATENT DOCUMENTS

| | | | |
|---|---|---|---|
| 4,253,238 A | * | 3/1981 | Sheldon ........................ 30/276 |
| 4,295,324 A | * | 10/1981 | Frantello et al. .............. 56/12.7 |
| 4,756,146 A | | 7/1988 | Rouse .......................... 56/256 |
| 4,805,389 A | * | 2/1989 | Hawkenson .............. 56/12.7 X |
| 5,020,224 A | | 6/1991 | Haupt .......................... 30/276 |
| 5,359,777 A | | 11/1994 | Bauer et al. ................... 30/276 |
| 5,713,191 A | | 2/1998 | Welton ........................ 56/12.1 |
| 5,979,064 A | | 11/1999 | Kitz et al. ..................... 30/347 |
| 6,035,618 A | | 3/2000 | Fogle .......................... 56/12.7 |
| 6,094,825 A | * | 8/2000 | Hinson ........................ 30/276 |
| 6,185,792 B1 | * | 2/2001 | Nelson et al. ............ 24/16 PB |
| 6,446,474 B1 | * | 9/2002 | Tabacchi et al. .......... 24/16 PB |
| 2003/0066169 A1 | * | 4/2003 | Liu ........................... 24/16 PB |

* cited by examiner

*Primary Examiner*—Douglas D. Watts
(74) *Attorney, Agent, or Firm*—Bernhard P. Molldrem, Jr.

(57) ABSTRACT

A replacement string arrangement for a string trimmer employs a brace in which the string is affixed. The brace has an arcuate member with an annular guide tunnel or guide sleeve at one end. The cutting string has an end affixed at a second end of the arcuate member. The string extends out that one end, then forms a loop or bight, and then passes slidably through the guide tunnel and continues radially outward. A free end of the string projects from the cutting head when the replacement string arrangement is installed in the cutting head. The brace and string can be unitarily formed, or the string can be fused into the one end of the arcuate member. The brace may have a wishbone shape. The string profile or cross section may be shaped for improved aerodynamics or improved cutting.

12 Claims, 2 Drawing Sheets

REPLACEMENT CUTTING ATTACHMENT FOR STRING TRIMMER

This application claim benefit of Provisional application No. 60/313,281 filed Aug. 17, 2001.

BACKGROUND OF THE INVENTION

This invention is directed to string trimmers, i.e., weed trimmers, of the type in which one or more lengths of a nylon or other type of string or line project radially from the rotary cutting head of the trimmer, and in which the moving cutting string slashes and severs leaves and stems of plants. The invention is also directed to a system and technique that facilitates replacing the string or line on the string trimmer. String trimmers may be of a fixed-string arrangement or of an extendible line arrangement, and this replacement string attachment may be used with either type.

Current string trimmers or weed trimmers typically have a cutting head in which line or string is wound upon a reel or spool, with the spool being situated inside an outer shell of the cutting head. There is a free end of the line projecting out through this shell, and that is what contacts the grass or weeds for cutting. The string trimmer may be gasoline powered, or electric (AC or battery), with a motor drive that spins the cutting head. The reel or spool typically has an annular bay, i.e., a recess in which the string is wound, and there may be two or more bays on the spool, with a cutting string reposed in each bay. The action of cutting grass and weeds abrades and wears out the string, and so the string has to be continually let out from the spool. When all the string has been used up, then the user has to rewind more string onto the spool, and that can be a difficult, tedious process. The line that is used may be too stiff to be handled easily, and because the dimensions of the bays on the spool are usually smaller than the size of the user's fingers, it is difficult to hold the string and secure it to the reel to start the rewinding process. Also, this type of trimmer is limited to using strings of round cross section or profile, and thus precludes the use of strings of other profiles that may actually be more suited to cutting some types of vegetation.

Several types of fixed string trimmers are also present in the current state of the art, and these typically have the string tied or secured to some part of the cutting head. In that case, if there is a failure or breakage of the cutting string, the string would have to be untied and replaced with a new string. In that case, the portion of the cutting head where the string is secured serves the purpose of the spool and bay of the spool type trimmer. Because the string has to be threaded through the cutting head and may have to be tied, there are also similar problems presented to the user when the time comes to secure the replacement string onto the trimmer.

OBJECTS AND SUMMARY OF THE INVENTION

Accordingly, it is an object of this invention to provide a trimmer replacement string arrangement that is simple to install and use, and which avoids the drawbacks of the prior art.

It is another object to provide a replacement trimmer string arrangement that can be employed with a large variety of existing string trimmers, and can be installed without need for any special tools.

It is a further object to provide a replacement trimmer string arrangement that can employ cutting strings of a wide variety of profiles and cross sections, and which can be made of a variety of suitable materials.

According to an aspect of this invention, a replacement string arrangement is provided for a string trimmer of the type having a rotary cutting head in which a spool (or the equivalent in the case of a fixed string trimmer) that may have one or several annular bays is provided to hold a length of cutting string. The replacement string arrangement employs a brace having an arcuate member with an annular guide tunnel or guide sleeve at one end of the arcuate member. The cutting string has one end affixed at a second end of the arcuate member of the brace, and the string extends out that one end, then after forming a loop or bight, passes slidably through said guide tunnel and continues radially outward, so that a free end that projects from the cutting head when the replacement string arrangement is installed in the cutting head. The brace and string can be of the same material and unitarily formed, or the string can be formed separately and fused into the one end of the arcuate member. In a favorable embodiment, the brace may have a "wishbone" shape (generally, a figure "7" or mirror image thereof). The string may be of a nylon monofilament, or may be any other suitable string, which may in some cases be woven or braided. The string may be shaped, as well, for improved aerodynamics or improved cutting.

The replacement string arrangement of this invention is installed by slipping the loop or bight of the string) over the spool to fit into a desired one of the bays, and then the user simply pulls the free end out to tighten the device against the spool. The free end may be passed through a guide that is provided on the shell or cover of the cutting head. In operation, the rotation of the unit pulls the cutting string device more snugly and securely against the spool, due to centrifugal force.

The above and many other objects, features, and advantages of this invention will become apparent from the ensuing detailed description of a preferred embodiment, which is illustrated in the Accompanying Drawing.

DETAILED DESCRIPTION OF A PREFERRED EMBODIMENT

Figure 1:
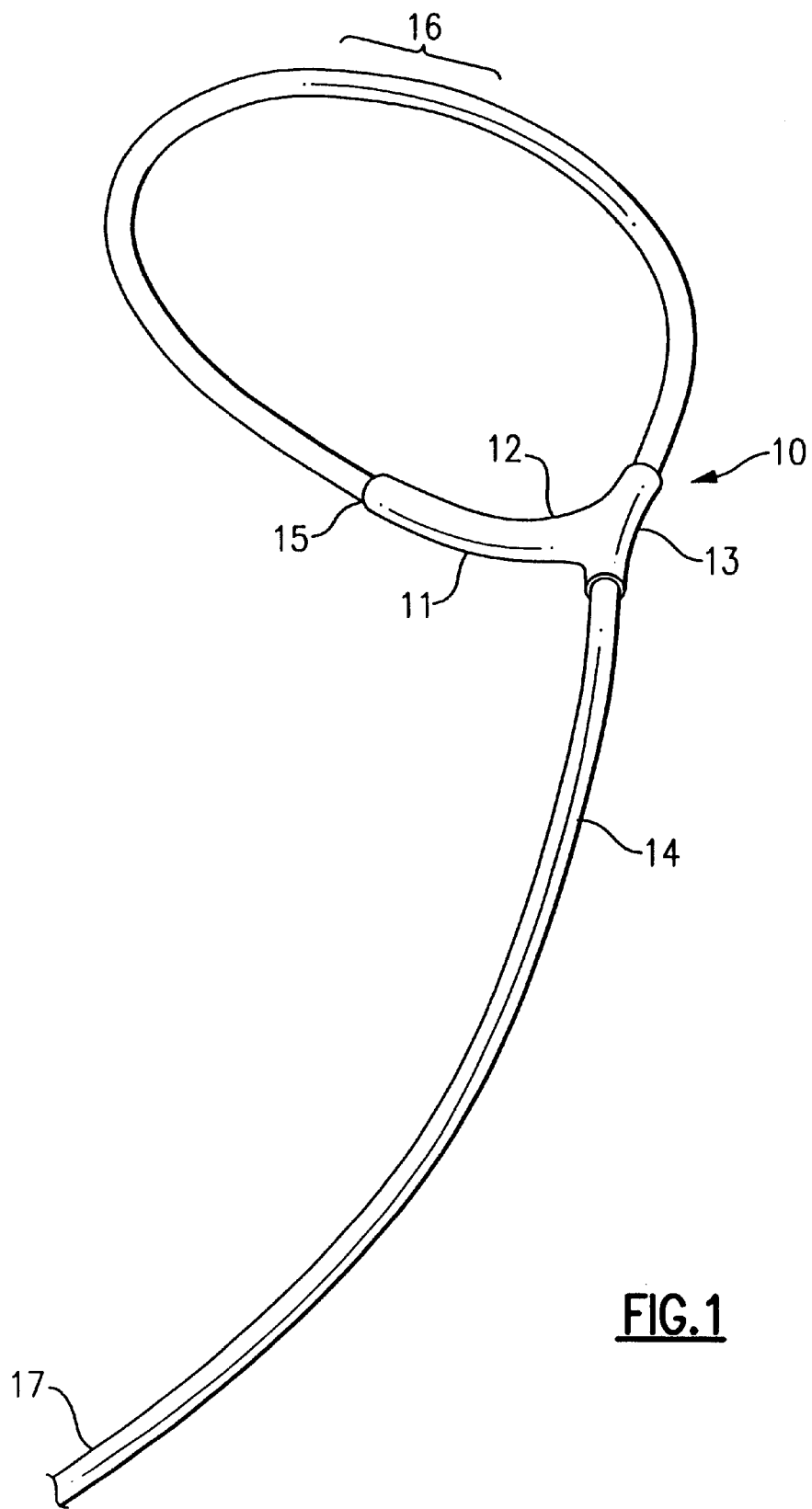
FIG. 1 is a perspective view of a replacement trimmer string arrangement according to one preferred embodiment of the present invention.

Now with reference to the Drawing, FIG. 1 shows one embodiment of the replacement trimmer string arrangement 10 of this invention. Here the arrangement 10 has a brace member 11, the brace being formed of an arcuate member 12 with a guide tunnel or guide sleeve 13 situated at one end of the arcuate member 11. A length of cutting string 14 is shown here with one end fused or planted into a second end 15 of the arcuate member 12. The string 14 then proceeds in a loop or bight 16, and passes or slides through the guide tunnel 13, and a free end 17 of the string extends out away from the brace member 11. In this embodiment, the brace 11 generally has a wishbone shape, with the arcuate member 12 forming the stem and the guide tunnel 13 forming the curved cross-bar of the wishbone shape. However, other designs can also be employed. The guide tunnel 13 also has an arc, in this case arcing in a direction opposite to that of the arcuate member 12, so that the guide tunnel 13 and arcuate member 12 diverge away from the first end of the arcuate member 12. When the string is threaded through the guide tunnel 13, as shown, the arrangment 10 has the same general shape as the numeral nine ("9").

In this embodiment, the string 14 is a large gauge, heavy duty nylon monofilament, which would be difficult to have wound up onto the reel or spool of the cutting head, but because the heavy duty filament used here is robust, the user may enjoy longer periods of use without need for adjustment or replacement of the line.

Figure 2:
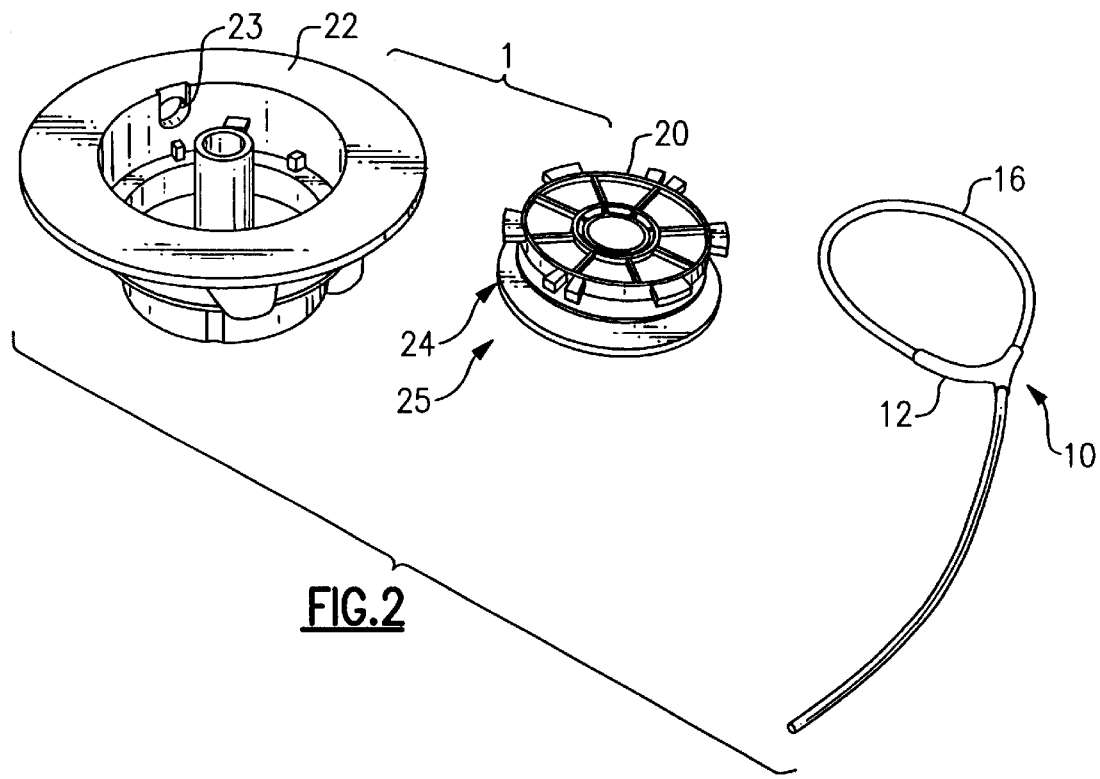
FIG. 2 is an assembly view showing the replacement trimmer string arrangement and the parts of the trimmer cutting head.

A typical cutting head assembly for a string trimmer unit is shown in FIG. 2, in which there is a spool 20 and an associated housing or shell 22 into which the spool is to be installed. The shell 22 has a guide opening 23 through which the cutting string is to project. Also shown here the spool 20 may have one, two or more bays, and in this version there are two bays 24 and 25, situated axially one above the other, and each in the form of an annular channel. These are originally intended for receiving a supply of monofilament line, but as shall be seen directly, the bays 24, 25 can serve as the location where the replacement trimmer line assembly 10 is fitted.

Figure 3:
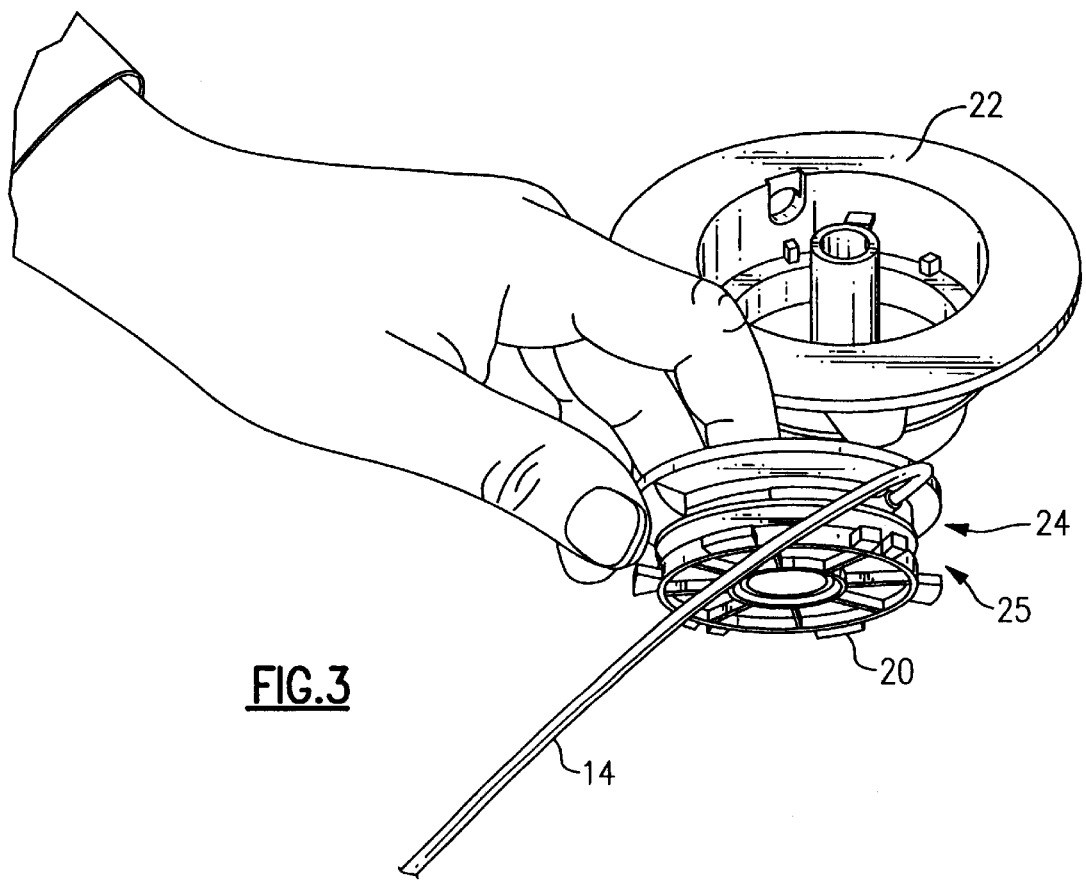
FIG. 3 is another perspective view showing installation of the string arrangement.

As illustrated in FIG. 3, the replacement arrangement 10 is easily installed on the one bay 24 of the spool 20 by simply looping the hoop or bight 16 over the spool, and then pulling out on the free end 17 of the string. This pulls the line out through the guide tunnel 13, and snugs the line and the arcuate member 12 of the brace against the inner wall of the bay 14. Then the spool 20 and cover 22 of the cutting head can be reassembled, with the line or string 14 passing through the guide opening 23, and the cutting head can be attached onto the drive spindle of the trimmer unit (not shown). When the trimmer unit is in operation, the spinning action of the cutting head actually causes the replacement assembly 10 to tighten even more snugly onto the spool 20. There is some sliding freedom of the string within the guide tunnel to allow the free end 17 to be pulled out to tighten the replacement string assembly, and to allow the hoop to be opened out when replacement is necessary. In operation, centrifugal force on the free end 17 pulls the hoop portion 16 tight onto the spool 20.

More than one replacement string assembly 10 can be used at a time on the same cutting head, with a respective replacement string assembly being positioned in each bay 24, 25. The arrangement of this invention simplifies the task of replacing the string on a rewindable spool and also gives the user more options as to what gauge or size of string. Because the replacement string arrangement is self-attaching, the time required in replacing the string is minimized. Also, because of the simplicity of installation, the problems that might arise from errors in installation are also minimized.

While the invention has been described here with reference to a preferred embodiment and various alternatives thereto, it should be apparent that the invention is not limited to such embodiment(s). Rather, many variations would be apparent to persons of skill in the art without departing from the scope and spirit of this invention, as defined in the appended claims.

I claim:

1. Replacement string arrangement for a string trimmer of the type having a rotary cutting head in which a spool having at least one annular bay is provided to hold a length of cutting string; the replacement string arrangement comprising a brace having an arcuate member with an annular guide tunnel provided at one end of the arcuate member; and a cutting string having one end affixed at a second end of the arcuate member of the brace, and passing slidably through said guide tunnel to form a hoop that fits around an annular bay of said spool and having a free end that projects radially from said cutting head when the replacement string arrangement is installed in said cutting head.

2. Replacement string arrangement according to claim 1 wherein cutting string includes a length of a polymer monofilament.

3. Replacement string arrangement according to claim 1 wherein said cutting string is unitarily formed with the arcuate member of said brace.

4. Replacement string arrangement according to claim 1 wherein said cutting string is fused into said second end of said arcuate member.

5. Replacement string arrangement according to claim 1 in which said brace is generally of a wishbone shape.

6. Replacement string arrangement according to claim 5 in which said brace and said string together generally have the shape of the numeral "9".

7. Replacement string arrangement according to claim 1 wherein said guide tunnel is in the form of a tubular sleeve.

8. Replacement string arrangement according to claim 7 wherein the arcuate member the tubular sleeve of said brace are curved in opposite sense so as to diverge from said one end of the arcuate member.

9. Replacement string arrangement according to claim 1 wherein said brace has a curvature adapted to match a corresponding curvature of said spool.

10. Replacement string arrangement according to claim 9 wherein said hoop formed by said string and said guide tunnel is adapted to be installed on said spool by placing the hoop over the spool and drawing out the free end of the string.

11. Replacement string arrangement according to claim 1 wherein said assembly generally has a shape of the numeral 9.

12. Replacement string arrangement according to claim 1 wherein said string enjoys at least some sliding freedom within the guide tunnel to allow centrifugal force on the free end to pull the hoop thereof tight onto the spool.

* * * * *